United States Patent
Yang et al.

(10) Patent No.: US 11,310,737 B2
(45) Date of Patent: Apr. 19, 2022

(54) PARAMETER CONFIGURATION METHOD AND EQUIPMENT

(71) Applicant: Guangdong OPPO Mobile Telecommunications Corp., Ltd., Guangdong (CN)

(72) Inventors: Ning Yang, Guangdong (CN); Jianhua Liu, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/473,156

(22) PCT Filed: Jan. 5, 2017

(86) PCT No.: PCT/CN2017/070320
§ 371 (c)(1),
(2) Date: Jun. 24, 2019

(87) PCT Pub. No.: WO2018/126408
PCT Pub. Date: Jul. 12, 2018

(65) Prior Publication Data
US 2019/0335396 A1 Oct. 31, 2019

(51) Int. Cl.
*H04W 52/02* (2009.01)
*H04W 88/06* (2009.01)

(52) U.S. Cl.
CPC ... *H04W 52/0216* (2013.01); *H04W 52/0225* (2013.01); *H04W 88/06* (2013.01)

(58) Field of Classification Search
CPC ......... H04W 52/0216; H04W 52/0225; H04W 88/06; H04L 1/1883; Y02D 70/00; Y02D 70/20
See application file for complete search history.

(56) References Cited

U.S. PATENT DOCUMENTS

2012/0120815 A1* 5/2012 Anderson ............. H04W 76/28
370/252
2012/0155355 A1 6/2012 Kwon et al.
(Continued)

FOREIGN PATENT DOCUMENTS

CN 101686551 A 3/2010
CN 101925161 A 12/2010
(Continued)

OTHER PUBLICATIONS

English translation of Russia OA for application No. 2019121610 dated Feb. 20, 2020.
(Continued)

*Primary Examiner* — Gary Mui
*Assistant Examiner* — Chuong M Nguyen
(74) *Attorney, Agent, or Firm* — Young Basile Hanlon & MacFarlane, P.C.

(57) ABSTRACT

A method for discontinuous reception (DRX) parameter configuration and a device are provided, including: determining, by a terminal, a target DRX parameter of a target DRX mechanism of the terminal when the terminal detects data of multiple services. Thereby a solution is provided for determining a DRX parameter of a target DRX mechanism when multiple services of a terminal are concurrent in a future communication system.

14 Claims, 7 Drawing Sheets

(56) References Cited

U.S. PATENT DOCUMENTS

| | | | | |
|---|---|---|---|---|
| 2013/0301421 | A1* | 11/2013 | Yi | H04W 76/28 370/241 |
| 2013/0308507 | A1* | 11/2013 | Wanstedt | H04W 52/0216 370/311 |
| 2014/0119255 | A1* | 5/2014 | Vannithamby | H04L 5/0037 370/311 |
| 2014/0247765 | A1* | 9/2014 | Baghel | H04W 76/28 370/311 |
| 2015/0124674 | A1* | 5/2015 | Jamadagni | H04W 8/20 370/311 |
| 2015/0351151 | A1* | 12/2015 | Huang | H04W 36/00837 370/252 |
| 2015/0365859 | A1* | 12/2015 | Dalsgaard | H04W 52/0212 370/331 |
| 2016/0066242 | A1* | 3/2016 | Su | H04W 36/00837 455/436 |
| 2017/0171907 | A1* | 6/2017 | Agarwal | H04W 52/0216 |

FOREIGN PATENT DOCUMENTS

| | | |
|---|---|---|
| CN | 102932882 A | 2/2013 |
| CN | 103428773 A | 12/2013 |
| CN | 104094644 A | 10/2014 |
| CN | 103402245 B | 12/2016 |
| EP | 2692073 A2 | 2/2014 |
| JP | 2008-092135 A | 4/2008 |
| RU | 2420030 C2 | 5/2011 |
| RU | 2599048 C2 | 10/2016 |
| WO | 2012134219 A2 | 10/2012 |

OTHER PUBLICATIONS

Invitation to Respond to Written Opinion for Singapore Application 11201905977Q dated Jun. 11, 2020.
Office Action for Canadian Application 3,048,685 dated Jul. 31, 2020.
Extended European search report issued in corresponding European application No. 17890351.4 dated Sep. 10, 2019.
India Office Action for IN Application 201917024738 dated Sep. 24, 2020.
Russia Notice of Allowance with English Translation for RU Application 2019121610/07(042221) dated Oct. 1, 2020.
Japan First Office Action with English translation for JP Application 2019-535924 dated Jan. 13, 2021. (6 pages).
European Examination Report for EP Application 17890351.4 dated Mar. 17, 2021. (4 pages).
China First Office Action with English Translation for CN Application 201780082383.3 dated Mar. 5, 2021. (13 pages).
ETRI, DRX Operation in LTE_Active state, 3GPP TSG RAN WG2#57 R2-070773, Feb. 12-16, 2007. (4 pages).
Huawei, HiSilicon, DRX with Multiple Numerologies, 3GPP TSG-RAN2 Meeting#96, R2-167576, Nov. 14-18, 2016. (3 pages).
Intel Corporation, Dynamic C—DRX configuration in NR, 3GPP TSG RAN WG2 Meeting#96, R2-168532, Nov. 14-18, 2016. (4 pages).
Japan First Office Action with English translation for JP Application 2019-535924 dated Jan. 22, 2021. (6 pages).
Canadian Examination Report for CA Application 3048685 dated Jun. 2, 2021. (4 pages).
Chinese Second Office Action with English Translation for CN Application 201780082383.3 dated Nov. 10, 2021. (11 pages).

* cited by examiner

Periodically monitor a Downlink Control Channel during T1, with (T2-T3) being a monitoring period and T3 being a monitoring time length Periodically monitor a Downlink Control Channel during T1, with a preset sleep time length being a monitoring period and T2 being a monitoring time length

PARAMETER CONFIGURATION METHOD AND EQUIPMENT

CROSS-REFERENCE TO RELATED APPLICATION(S)

This application is a 371 application of International Application No. PCT/CN2017/070320, filed on Jan. 5, 2017, the entire disclosure of which is hereby incorporated by reference.

TECHNICAL FIELD

The present disclosure relates to a technical field of communication, in particular, to a method for parameter configuration and a device.

BACKGROUND

In wireless communication systems, a Discontinuous Reception (DRX) mechanism is usually used to save power consumption of terminals. The DRX mechanism is a reception mechanism adopted by a Long Term Evolution (LTE) system to reduce power consumption of terminals, which makes a terminal in an alternate state of activation and sleep by introducing a mechanism that a receiving antenna of the terminal is periodically opened and closed, so as to periodically wake up to monitor a Physical Downlink Control Channel (PDCCH) instead of continuously monitoring the PDCCH to achieve the purpose of reducing the power consumption of the terminal.

As shown in FIG. 1, it is a schematic diagram of the principle of the DRX mechanism in the LTE system in the prior art. A continuous monitoring duration (On-Duration) therein indicates a time period during which the terminal monitors the PDCCH channel. During the On-Duration the radio frequency channel of a UE is opened and the PDCCH is continuously monitored by the UE. During the time except the On-Duration, the UE is in a sleep state, and its radio frequency link will be shut down to save power. The On-Duration occurs periodically, and a specific period is configured and implemented by an evolved Node B (eNB). In order to avoid an excessive communication delay between the eNB and the terminal while achieving power saving of the terminal, concepts of a long cycle and a short cycle are introduced. In the short cycle, the On-Duration occurs more frequently than in the long cycle. While configuring the long cycle, the short cycle may be selected to configure to shorten the time of monitoring, by the terminal, the control channel and reduce the data transmission delay. In order to implement the DRX mechanism, various timers are designed in the LTE system. In combination with a Hybrid Automatic Repeat Request (HARQ) process, an operation process under the DRX mechanism is provided. The relevant timers include: 1. an Inactive timer. When a terminal receives a control signaling for an HARQ initial transmission during an On-Duration, the Inactive Timer is started, and before the Inactive Timer expires, the terminal continuously monitors the control channel. If the terminal receives a control signaling for the HARQ initial transmission before the Inactivity Timer expires, the Inactivity Timer will be terminated and then restarted. 2. a Round Trip (RTT) Timer, only applicable to Downlink (DL). If a terminal receives a control signaling for an HARQ retransmission, this timer will be started. If data in a corresponding HARQ process is still unsuccessfully decoded after a previous HARQ transmission, the terminal starts a Retransmission Timer when the RTT Timer expires. If data in a corresponding HARQ process is decoded successfully after a previous HARQ transmission, the terminal does not start the Retransmission Timer when the RTT Timer expires. 3. a Retransmission Timer. During the operation of the Retransmission Timer, a terminal monitors the control channel and waits for a retransmission of a corresponding HARQ process.

As shown in FIG. 2, it is an action process of each timer in the DRX mechanism in the prior art. First, an On-duration Timer is started. During the operation of the On-duration Timer, an eNB schedules a DL initial transmission at a time point t1, then an Inactivity Timer is started and an HARQ RTT timer is started at the same time. The Inactivity Timer expires first at a time point t2. The HARQ RTT Timer expires at a time point t3. At this time, since an initial transmission did not succeed at the time point t1 (the terminal feedbacks a Negative ACKnowledgment, NACK), then a Retransmission Timer is started. At a time point t4, the eNB schedules a first retransmission, then the Retransmission Timer is stopped and an RTT timer is started at the same time. At a time point t6, the RTT Timer expires, and the first retransmission at the time point t4 is still unsuccessful (the terminal feedbacks an NACK), then the Retransmission Timer is started. At a time point t7, the eNB schedules a second retransmission, the Retransmission Timer is stopped, and the RTT timer is started at the same time. As the second retransmission is success (terminal feedbacks an ACK), the Retransmission Timer will not be further started when the RTT timer expires.

The DRX mechanism in 5th Generation (5G) mobile communication networks can support multiple services, i.e. the configuration parameters of DRX mechanisms corresponding to different services are different. How to determine reasonable DRX configuration parameters is a hot issue in 5G networks when multiple services are concurrent.

SUMMARY

An implementation of the present disclosure provides a method for discontinuous reception (DRX) parameter configuration and a device, to provide a configuration solution of DRX parameters for a terminal when multiple services are concurrent in a communication system.

In a first aspect, an implementation of the present disclosure provides a method for discontinuous reception (DRX) parameter configuration, which includes:

determining, by a terminal, a target DRX parameter of a target DRX mechanism of the terminal when the terminal detects data of multiple services.

In a second aspect, an implementation of the present disclosure provides a method for discontinuous reception (DRX) parameter configuration, which includes:

determining, by a network-side device, a target DRX parameter of a target DRX mechanism according to DRX parameters of DRX mechanisms corresponding to multiple services when the network-side device detects data of the multiple services of a terminal to be transmitted;

sending, by the network-side device, the target DRX parameter to the terminal.

In a third aspect, an implementation of the present disclosure provides a terminal with functions of realizing behaviors of the terminal in the above method design. The functions may be implemented by hardware or by executing corresponding software through hardware. The hardware or software includes one or more modules corresponding to the above functions.

In a possible design, the terminal includes a processor configured to support the terminal to perform corresponding functions in the above method. Furthermore, the terminal may include a transceiver for supporting communication between the terminal and a network-side device. Furthermore, the terminal may further include a memory for coupling with the processor, which stores necessary program instructions and data for the terminal.

In a fourth aspect, an implementation of the present disclosure provides a network-side device with functions of realizing behaviors of the network-side device in the above method design. The functions may be implemented by hardware or by executing corresponding software through hardware. The hardware or software includes one or more modules corresponding to the above functions.

In a possible design, the network-side device includes a processor configured to support the network-side device to perform the corresponding functions in the above method. Furthermore, the network-side device may include a transceiver for supporting communication between the network-side device and a terminal. Furthermore, the network-side device may further include a memory for coupling with the processor, which stores necessary program instructions and data for the network-side device.

BRIEF DESCRIPTION OF DRAWINGS

The following is a brief introduction of the drawings needed in the description of implementations or the prior art.

DETAILED DESCRIPTION

Hereinafter, technical solutions in implementations of the present disclosure will be described with reference to accompanying drawings.

Figure 3:
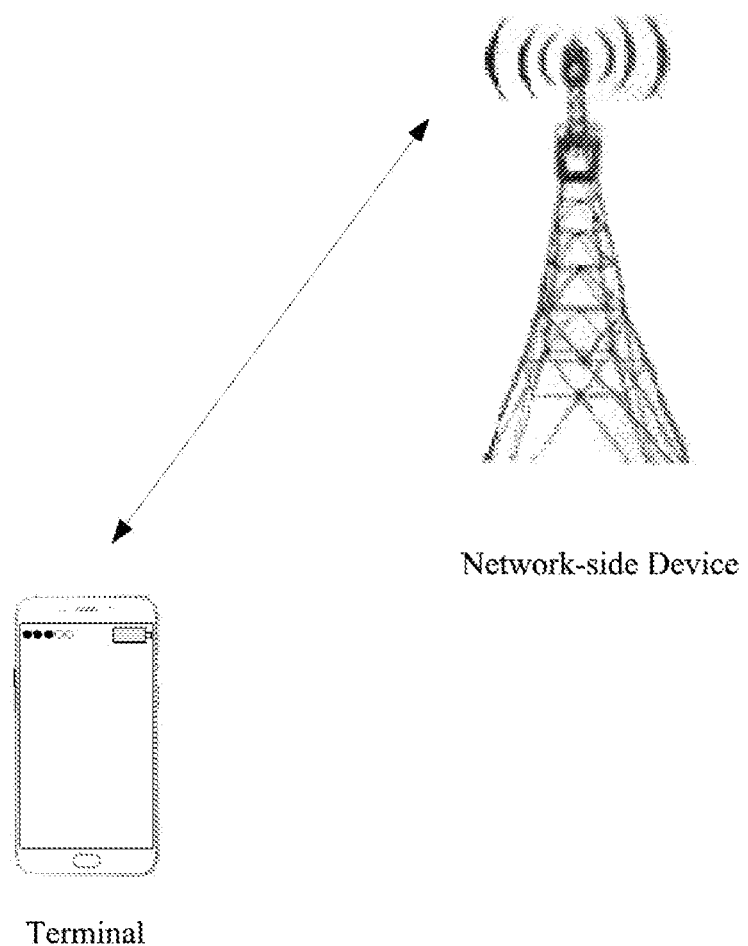
FIG. 3 is a schematic diagram of a possible network architecture provided by an implementation of the present disclosure.

Please refer to FIG. 3. FIG. 3 is a possible network architecture provided by an implementation of the present disclosure. The network architecture includes a network-side device and a terminal. When the terminal accesses a mobile communication network provided by the network-side device, the terminal and the network-side device can be communicatively connected through a wireless link. The network-side device, for example, may a base station in a 5G network. In implementations of the present disclosure, terms "network" and "system" are often used interchangeably, and the meanings thereof can be understood by those skilled in the art. Terminals involved in the implementations of the present disclosure may include various devices with wireless communication functions, such as hand-held devices, vehicle-mounted devices, wearable devices, computing devices or other processing devices connected to a wireless modem, as well as various forms of User Equipment (UE), Mobile Stations (MS), terminal devices, etc. For convenience of description, the above-mentioned devices are collectively referred to as terminals.

In addition, the discontinuous reception (DRX) mechanism described in the implementations of the present disclosure refers to a DRX mechanism in a Radio Resource Control (RRC) connected state (DRX in RRC_CONNECTED).

Figure 4:
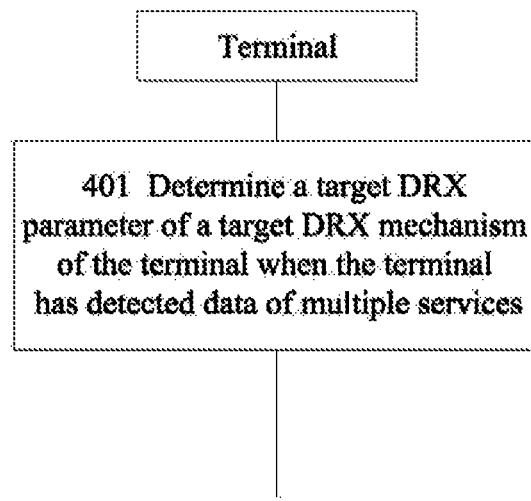
FIG. 4 is a communication schematic diagram of a method for discontinuous reception (DRX) parameter configuration provided by an implementation of the present disclosure.

Please refer to FIG. 4. FIG. 4 is a method for parameter configuration of a discontinuous reception (DRX) mechanism provided by an implementation of the present disclosure, applied to a mobile communication network including a network-side device and a terminal, wherein the network-side device is communicatively connected with the terminal. The method includes: part 401, specifically as follows.

In 401, a terminal determines a target DRX parameter of a target DRX mechanism of the terminal when the terminal has detected data of multiple services.

Service types of the multiple services are different, and the multiple services, for example, may come from different logical channels/logical channel groups/Data Radio Bearers, or have different quality of service flow IDs (QoS-Flow-IDs), etc.

It can be seen that an implementation of the present disclosure provides a method for DRX parameter configuration when multiple services are concurrent. When a terminal detects data of multiple services, the terminal determines a target DRX parameter of a target DRX mechanism of the terminal. The target DRX mechanism is used for the terminal to monitor a Downlink Control Channel and sleep, and to receive data of the multiple services during a time period of monitoring the Downlink Control Channel. It can be seen that the implementation of the present disclosure solves the problem of determining DRX parameters of DRX mechanism when multiple services are concurrent.

In a possible example, the terminal determines target DRX parameter of the target DRX mechanism of the terminal, including: the terminal determines target DRX parameters of the target DRX mechanism of the terminal according to DRX parameters of DRX mechanisms corresponding to the multiple services.

In this possible example, the terminal determines the target DRX parameter of the target DRX mechanism of the terminal according to the DRX parameters of the DRX mechanisms corresponding to the multiple services, including: the terminal determines a maximum of the DRX parameters of the DRX mechanisms corresponding to the multiple services as the target DRX parameter of the target DRX mechanism; or, the terminal determines a DRX parameter of a DRX mechanism corresponding to a service with a highest priority among the multiple services as the target DRX parameter of the target DRX mechanism.

In a possible example, the target DRX parameter includes a timing length of an Inactivity Timer period and a timing length of a first timer of the target DRX mechanism. The Inactivity Timer is used to be started when the terminal has monitored a Downlink Control Channel during a time period of On-Duration. A time period of the Inactivity Timer is used for the terminal to periodically monitor a Downlink Control Channel with a preset sleep time length being a monitoring period and the timing length of the first timer being a monitoring time length. The first timer is used to be started when the terminal has monitored a Downlink Control Channel during the time period of On-Duration, and a time period of the first timer is used for prolonging the timing length of the first timer to a reference timing length of the Inactivity Timer of a DRX mechanism corresponding to a reference service when the terminal has monitored the Downlink Control Channel of the reference service.

The terminal determines the target DRX parameter of the target DRX mechanism of the terminal according to the DRX parameters of the DRX mechanisms corresponding to the multiple services, including: the terminal determines a maximum value of timing lengths of Inactivity Timers of the DRX mechanisms corresponding to the multiple services as the timing length of the Inactivity Timer of the target DRX mechanism, and determines a minimum value of timing lengths of the Inactivity Timers of the DRX mechanism corresponding to the multiple services as the timing length of the first timer of the target DRX mechanism; or, the terminal determines a maximum value of timing lengths of the Inactivity Timers of the DRX mechanisms corresponding to the multiple services as the timing length of the Inactivity Timer of the target DRX mechanism, and determining a timing length of an Inactivity Timer of a DRX mechanism corresponding to a service with a highest priority among the multiple services as the timing length of the first timer of the target DRX mechanism.

In this possible example, the preset sleep time length is less than the minimum value of timing lengths of Inactivity Timers of DRX mechanisms corresponding to the multiple services.

By setting the preset sleep time length to be less than the minimum value of periods of Inactivity Timers of the DRX mechanisms corresponding to the multiple services, it can be ensured that a time period of an Inactive Timer of a DRX mechanism corresponding to any one of the multiple services will not completely falling into a range of a time period corresponding to a preset sleep time length, so as to avoid that data of a service corresponding to the time period of the Inactive Timer that falls into the preset sleep time length cannot be received, which is beneficial to improving the stability of data transmission.

In a possible example, the target DRX parameter is a timing length of an Inactivity Timer of a target DRX mechanism. The terminal determines the target DRX parameter of the target DRX mechanism of the terminal according to DRX parameters of DRX mechanisms corresponding to the multiple services, including: the terminal determines a timing length of an Inactivity Timer of a DRX mechanism corresponding to a reference service scheduled first during a time period of On-Duration of a current DRX mechanism as the timing length of Inactivity Timer of the target DRX mechanism.

In a possible example, the terminal determines the target DRX parameter of the target DRX mechanism of the terminal, including: the terminal receives a target DRX parameter of a target DRX mechanism sent by a network-side device and determines the target DRX parameter of the target DRX mechanism of the terminal, wherein the target DRX parameter is determined by the network-side device according to DRX parameters of DRX mechanisms corresponding to multiple services.

In a possible example, the target DRX parameter is a maximum value of the DRX parameters of the DRX mechanisms corresponding to the multiple services; or, the target DRX parameter is a DRX parameter of a DRX mechanism corresponding to a service with a highest priority among the multiple services.

In a possible example, the target DRX parameter includes at least one of the following: a time length of a DRX Cycle, a timing length of an On-duration Timer, and a timing length of an Inactivity Timer.

It should be noted that the time length of a DRX Cycle described in an implementation of the present disclosure is not limited to a time length of a long cycle and a time length of a short cycle in the existing LTE system, but may also be other types of time lengths of DRX Cycles.

In a possible example, the target DRX parameter includes a timing length of an Inactivity Timer and a timing length of a first timer of the target DRX mechanism. The Inactivity Timer is used to be started when the terminal has monitored a Downlink Control Channel during time period of On-Duration. A time period of the Inactivity Timer is used for the terminal to periodically monitor a Downlink Control Channel with a preset sleep time length being a monitoring period and the timing length of the first timer being a monitoring time length. The first timer is used to be started when the terminal has monitored a Downlink Control Channel during the time period of On-Duration, and a time period of the first timer is used for prolonging the timing length of the first timer to a reference timing length of the Inactivity Timer of a DRX mechanism corresponding to a reference service when the terminal has monitored the Downlink Control Channel of the reference service.

The timing length of the Inactivity Timer of the target DRX mechanism is a maximum value of timing lengths of Inactivity Timers of the DRX mechanisms corresponding to the multiple services, and the timing length of the first timer of the target DRX mechanism is a minimum value of timing lengths of the Inactivity Timers of the DRX mechanisms corresponding to the multiple services. Or, the timing length of the Inactivity Timer of the target DRX mechanism is a maximum value of timing lengths of Inactivity Timers of the DRX mechanisms corresponding to the multiple services, and the timing length of the first timer of the target DRX mechanism is a timing length of an Inactivity Timer of a DRX mechanism corresponding to a service with a highest priority among the multiple services.

In a possible example, the target DRX parameter is a timing length of an Inactivity Timer of the target DRX mechanism, the timing length of the Inactivity Timer of the target DRX mechanism is a timing length of an Inactivity Timer of a DRX mechanism corresponding to a reference service scheduled first by the network-side device during a time period of On-Duration of a current DRX mechanism.

Figure 5:
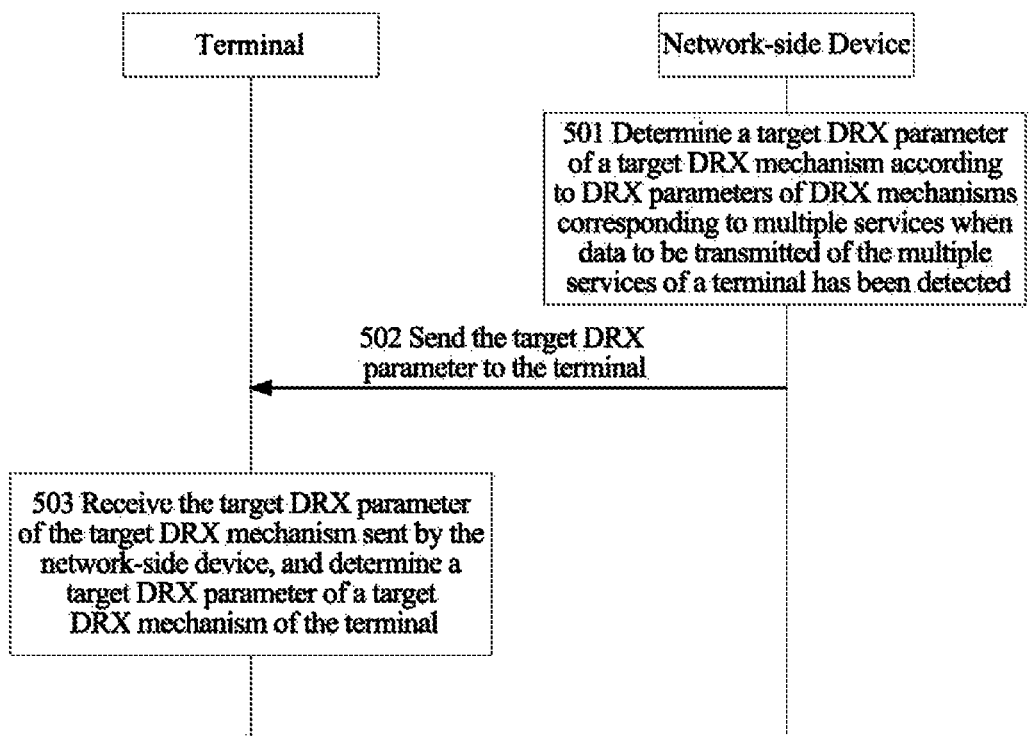
FIG. 5 is a communication schematic diagram of another method for DRX parameter configuration provided by an implementation of the present disclosure.

Please refer to FIG. 5. FIG. 5 is a method for parameter configuration of a DRX mechanism provided by an implementation of the present disclosure, applied to a mobile communication network including a network-side device and a terminal, wherein the network-side device is communicatively connected with the terminal. The method is described from multiple aspects of the network-side device and the terminal. The method includes parts 501 to 503, specifically as follows.

In 501, when a network-side device has detected data of multiple services of a terminal to be transmitted, the network-side device determines a target DRX parameter of a target DRX mechanism according to DRX parameters of DRX mechanisms corresponding to the multiple services.

In a possible example, the network-side device determines the target DRX parameter of the target DRX mechanism according to the DRX parameters of the DRX mechanisms corresponding to the multiple services, including: the network-side device determines a maximum value of the DRX parameter of the DRX mechanisms corresponding to the multiple services as the target DRX parameter of the target DRX mechanism; or, the network-side device determines a DRX parameter of a DRX mechanism corresponding to a service with a highest priority among the multiple services as the target DRX parameter of the target DRX mechanism.

In this possible example, the target DRX parameters include at least one of the following: a time length of a DRX Cycle, a timing length of an On-duration Timer, and a timing length of an Inactivity Timer.

In a possible example, the target DRX parameter includes a timing length of an Inactivity Timer period and a timing length of a first timer of the target DRX mechanism. The Inactivity Timer is used to be started when the terminal has monitored a Downlink Control Channel during a time period of On-Duration. The time period of the Inactivity Timer is used for the terminal to periodically monitor a Downlink Control Channel with a preset sleep time length being a monitoring period and the timing length of the first timer being a monitoring time length. The first timer is used to be started when the terminal has monitored a Downlink Control Channel during the time period of On-Duration, and the time period of the first timer is used for prolonging the timing length of the first timer to a reference timing length of the Inactivity Timer of a DRX mechanism corresponding to a reference service when the terminal has monitored the Downlink Control Channel of the reference service.

The timing length of the Inactivity Timer of the target DRX mechanism is a maximum value of timing lengths of Inactivity Timers of the DRX mechanisms corresponding to the multiple services, and the timing length of the first timer of the target DRX mechanism is a minimum value of timing lengths of the Inactivity Timers of the DRX mechanisms corresponding to the multiple services. Or, the timing length of the Inactivity Timer of the target DRX mechanism is a maximum value of timing lengths of the Inactivity Timers of the DRX mechanisms corresponding to the multiple services, and the timing length of the first timer of the target DRX mechanism is a timing length of an Inactivity Timer of a DRX mechanism corresponding to a service with a highest priority among the multiple services.

In a possible example, the target DRX parameter is a timing length of an Inactivity Timer of the target DRX mechanism, the timing length of the Inactivity Timer of the target DRX mechanism is a timing length of an Inactivity Timer of a DRX mechanism corresponding to a reference service scheduled first by the network-side device during a time period of On-Duration of a current DRX mechanism.

In 502, the network-side device sends the target DRX parameter to the terminal.

In 503, the terminal receives the target DRX parameter of the target DRX mechanism sent by the network-side device, and determines a target DRX parameter of a target DRX mechanism of the terminal, wherein the target DRX parameter is determined by the network-side device according to DRX parameters of DRX mechanisms corresponding to the multiple services.

It can be seen that, in an implementation of the present disclosure, when a network-side device has detected data of multiple services of a terminal to be transmitted, the network-side device determines a target DRX parameter of a target DRX mechanism according to DRX parameters of DRX mechanisms corresponding to the multiple services, and sends the target DRX parameter to the terminal. The terminal receives the target DRX parameter, determines a target DRX parameter of a target DRX mechanism of the terminal as the DRX parameter. The target DRX mechanism is used for the terminal to monitor a Downlink Control Channel and sleep, and to receive data of multiple services during the time period of monitoring the Downlink Control Channel. It can be seen that the implementation of the invention solves the problem of determining DRX parameters of DRX mechanisms when multiple services are concurrent.

Implementations of the present disclosure will be described below with reference to specific examples.

Figure 6A:
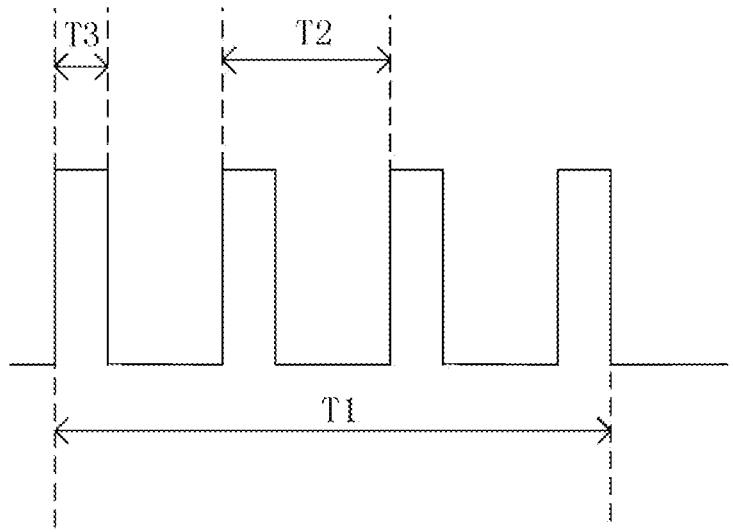
FIG. 6A is a schematic functional diagram of an Inactivity Timer of a DRX mechanism when three services are concurrent according to an implementation of the present disclosure.

As shown in FIG. 6A, it is assumed that multiple services include a first service, a second service and a third service, and a timing length of an Inactivity Timer of a first DRX mechanism corresponding to the first service is T1, a timing length of an Inactivity Timer of a second DRX mechanism corresponding to the second service is T2, and a timing length of an Inactivity Timer of a third DRX mechanism corresponding to the third service is T3, and T1>T2>T3. Target DRX parameters of a target DRX mechanism of the terminal are a timing length of an Inactivity Timer and a timing length of a first timer. The Inactivity Timer is used to be started when the terminal has monitored a Downlink Control Channel during a time period of On-Duration, and the time period of the Inactivity Timer is used for the terminal to periodically monitor a Downlink Control Channel with a preset sleep time length being a monitoring period and the timing length of the first timer being a monitoring time length. The first timer is used to be started when the terminal has monitored a Downlink Control Channel of a reference service during the time period of On-Duration, and the time period of the first timer is used for prolonging the timing length of the first timer to a reference timing length of the Inactivity Timer of a DRX mechanism corresponding to the reference service when the terminal has monitored the Downlink Control Channel of the reference service.

When the terminal detects data of the above three services, firstly a maximum value T1 of T1, T2 and T3 is determined as a timing length of the Inactivity Timer of a target DRX mechanism, and secondly a minimum value T3 of T1, T2 and T3 is determined as a timing length of a first timer of the target DRX mechanism.

Furthermore, after determining the minimum value of T1, T2 and T3 as the timing length of the first timer of the target DRX mechanism, the terminal may further determine a monitoring period, i.e., a preset sleep time length, according to the following formula:

(the preset time of sleep+the timing length of the first timer)=T2.

Furthermore, the network-side device may only send a Downlink Control Channel within each time period of the first timer described in this example, thus ensuring that data of any one of the multiple services sent by the network-side device can be received by the terminal, which is beneficial to improving the stability and accuracy of data transmission between the terminal and the network-side device.

Figure 6B:
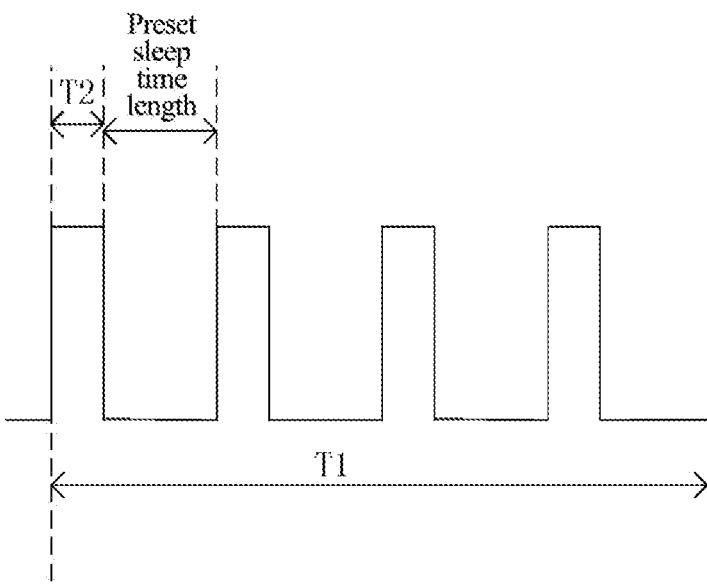
FIG. 6B is a schematic functional diagram of an Inactivity Timer of another DRX mechanism when three services are concurrent according to an implementation of the present disclosure.

As shown in FIG. 6B, it is assumed that multiple services include a first service, a second service and a third service, a priority of the second service is greater than a priority of the first service, the priority of the first service is greater than a priority of the third service, and a timing length of an Inactivity Timer of a first DRX mechanism corresponding to the first service is T1, a timing length of an Inactivity Timer of a second DRX mechanism corresponding to the second service is T2, a timing length of an Inactivity Timer of a third DRX mechanism corresponding to the third service is T3, and T1>T2>T3. Target DRX parameters of a target DRX mechanism of the terminal are a timing length of an Inactivity Timer and a timing length of a first timer. The Inactivity Timer is used to be started when the terminal has monitored a Downlink Control Channel during a time period of On-Duration, and the time period of the Inactivity Timer is used for the terminal to periodically monitor a Downlink Control Channel with a preset sleep time length being a monitoring period and the timing length of the first timer being a monitoring time length. The first timer is used to be started when the terminal has monitored a Downlink Control Channel of a reference service during the time period of On-Duration, and the time period of the first timer is used for prolonging the timing length of the first timer to a reference timing length of the Inactivity Timer of a DRX mechanism corresponding to the reference service when the terminal has monitored the Downlink Control Channel of the reference service.

When the terminal has detected data of the above three services, firstly a maximum value T1 of T1, T2 and T3 is determined as a timing length of an Inactivity Timer of a target DRX mechanism, and secondly a timing length T2 of an Inactivity Timer of a second DRX mechanism corresponding to the second service with the highest priority is determined as a timing length of the first timer.

Furthermore, after determining the timing length T2 of the Inactivity Timer of the second DRX mechanism corresponding to the second service with the highest priority as the timing length of the first timer, the terminal may further determine the monitoring period, i.e., a preset sleep time length, according to the following formula, (the preset sleep time length+the timing length of the first timer)*$n$=T1, $n$ is a positive integer.

The above solutions of implementations of the present disclosure are mainly introduced from the perspective of interaction between various network elements. It can be understood that in order to realize the above-mentioned functions, the terminal and the network-side device include corresponding hardware structures and/or software modules for performing various functions. Those skilled in the art should readily recognize that the present disclosure can be implemented in hardware or in a combination of hardware and computer software based on a combination with the exemplary units and algorithm acts described in the implementations disclosed in the present document. Whether a certain function is executed by hardware or by computer software driving hardware depends on the specific application and design constraints of the technical solution. Skilled in the art may use different methods to realize the described functions for each particular application, but such realization should not be considered to be beyond the scope of the present disclosure.

The implementations of the present disclosure may divide the terminal and the network-side device into functional units according to the above method examples, for example, various functional units may be divided corresponding to various functions, or two or more functions can be integrated into one processing unit. The above integrated unit may be implemented in a form of hardware, or may be implemented in a form of software function unit. It should be noted that the division of units in the implementations of the present disclosure is illustrative and is only a logical function division, and there may be other division ways in actual implementation.

Figure 7A:
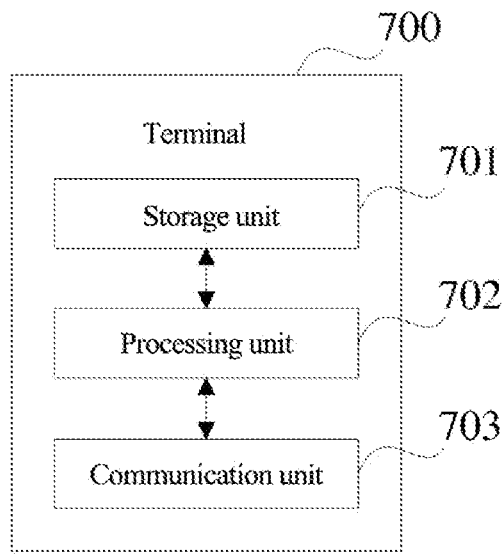
FIG. 7A is a schematic structural diagram of a terminal provided by an implementation of the present disclosure.

In a case of using integrated units, FIG. 7A shows a possible structural diagram of a terminal involved in the above implementations. A terminal 700 includes a processing unit 702 and a communication unit 703. The processing unit 702 is used for controlling and managing acts of the terminal. For example, the processing unit 702 is used for supporting the terminal to perform act 401 in FIG. 4, act 503 in FIG. 5, and/or other processes of the techniques described in the present document. The communication unit 703 is used for supporting communication between the terminal and other devices, such as communication between the terminal and the network-side device shown in FIG. 1. The terminal may further include a storage unit 701 used for storing program codes and data of the terminal.

The processing unit 702 may be a processor or a controller, such as a Central Processing Unit (CPU), a general-purpose processor, a Digital Signal Processor (DSP), an application-specific integrated circuit (ASIC), a Field Programmable Gate Array (FPGA) or other programmable logic devices, a transistor logic device, a hardware component, or any combination thereof. The processing unit may implement or execute various illustrative logical blocks, modules, and circuits described in connection with the content disclosed in the present disclosure. The processor may also be a combination for implementing computing functions, e.g., a combination including one or more microprocessors, a combination of a DSP and a microprocessor. The communication unit 703 may be a transceiver, a transceiving circuit. The storage unit 701 may be a memory.

Figure 7B:
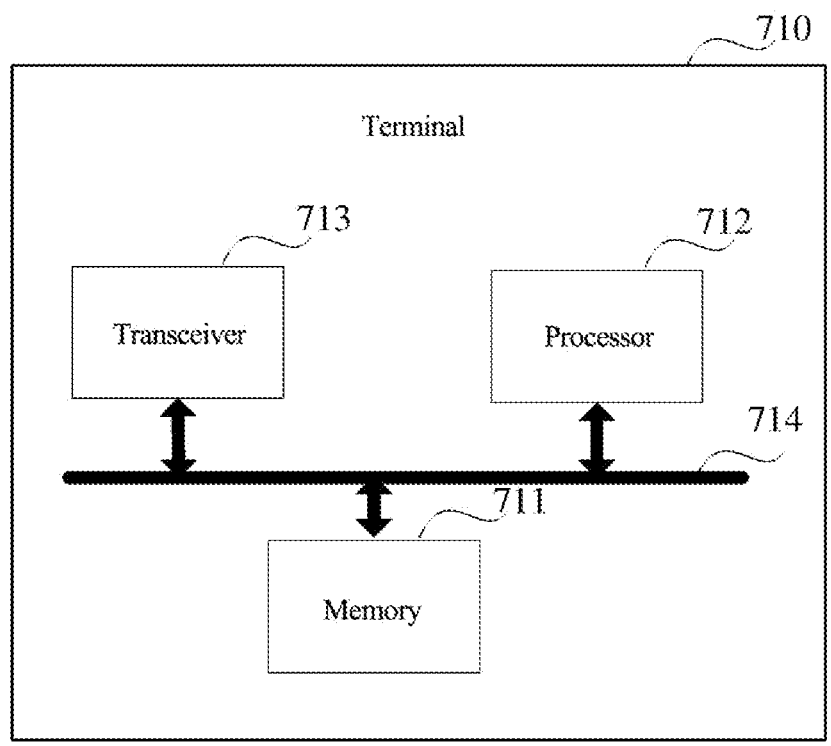
FIG. 7B is a schematic structural diagram of another terminal provided by an implementation of the present disclosure.

When the processing unit 702 is a processor, the communication unit 703 is a transceiver, and the storage unit 701 is a memory, the terminal involved in an implementation of the present disclosure may be a terminal shown in FIG. 7B.

Referring to FIG. 7B, the terminal 710 includes a processor 712, a transceiver 713, and a memory 711. Optionally, the terminal 710 may further include a bus 714. The transceiver 713, the processor 712, and the memory 711 may be connected with each other through the bus 714. The bus 714 may be a Peripheral Component Interconnect (PCI) bus or an Extended Industry Standard Architecture (EISA) bus or the like. The bus 714 may be categorized as an address bus, a data bus, a control bus. For convenience of representation, only one thick line is used to represent the bus in FIG. 7B, but it does not represent only one bus or one type of bus.

The processing unit is used for determining a target DRX parameter of a target DRX mechanism when data of multiple services has been detected.

In a possible example, the processing unit 702 is specifically used for determining the target DRX parameter of the target DRX mechanism according to DRX parameters of DRX mechanisms corresponding to the multiple services.

In a possible example, the processing unit 702 is specifically used for determining a maximum value of the DRX parameters of DRX mechanisms corresponding to the multiple services as the target DRX parameter of the target DRX mechanism; or, determining a DRX parameter of a DRX mechanism corresponding to a service with a highest priority among the multiple services as the target DRX parameter of the target DRX mechanism.

In a possible example, the target DRX parameters include a timing length of an Inactivity Timer and a timing length of a first timer of the target DRX mechanism. The Inactivity Timer is used to be started when the terminal has monitored a Downlink Control Channel during a time period of On-Duration. The time period of the Inactivity Timer is used for the terminal to periodically monitor a Downlink Control Channel with a preset sleep time length being a monitoring period and the timing length of the first timer being monitoring time length. The first timer is used to be started when the terminal has monitored a Downlink Control Channel during the time period of On-Duration, and a time period of the first timer is used for prolonging the timing length of the first timer to a reference timing length of the Inactivity Timer of a DRX mechanism corresponding to a reference service when the terminal has monitored the Downlink Control Channel of the reference service.

The processing unit 702 is specifically used for: determining a maximum value of timing lengths of Inactivity Timers of DRX mechanisms corresponding to the multiple services as the timing length of the Inactivity Timer of a target DRX mechanism, and determining a minimum value of timing lengths of the Inactivity Timers of the DRX mechanism corresponding to the multiple services as the timing length of the first timer of the target DRX mechanism; or, determining a maximum value of timing lengths of the Inactivity Timers of the DRX mechanisms corresponding to the multiple services as the timing length of the Inactivity Timer of the target DRX mechanism, and determining a timing length of an Inactivity Timer of a DRX mechanism corresponding to a service with a highest priority among the multiple services as the timing length of the first timer period of the target DRX mechanism.

In a possible example, the target DRX parameter is a timing length of an Inactivity Timer of a target DRX mechanism, and the processing unit 702 is specifically used for: determining a timing length of an Inactivity Timer of a DRX mechanism corresponding to a reference service scheduled first during a time period of On-Duration of a current DRX mechanism as a timing length of the Inactivity Timer of a target DRX mechanism.

In a possible example, the terminal further includes a communication unit 703, and the processing unit 702 is specifically used for receiving a target DRX parameter of a target DRX mechanism sent by a network-side device through the communication unit 703 and determining the target DRX parameter of the target DRX mechanism, wherein the target DRX parameter is determined by the network-side device according to DRX parameters of DRX mechanisms corresponding to the multiple services.

In a possible example, the target DRX parameter is a maximum of the DRX parameters of the DRX mechanisms corresponding to the multiple services; or, the target DRX parameter is a DRX parameter of a DRX mechanism corresponding to a service with a highest priority among the multiple services.

In a possible example, the target DRX parameter includes at least one of the following:

a time length of a DRX Cycle, a timing length of an On-duration Timer, and a timing length of an Inactivity Timer.

In a possible example, the target DRX parameter includes a timing length of an Inactivity Timer and a timing length of a first timer of the target DRX mechanism. The Inactivity Timer is used to be started when the terminal has monitored a Downlink Control Channel during a time period of On-Duration. A time period of the Inactivity Timer is used for the terminal to periodically monitor a Downlink Control Channel with a preset sleep timing length being a monitoring period and the timing length of the first timer beings monitoring time length. The first timer is used to be started when the terminal has monitored a Downlink Control Channel during the time period of On-Duration, and a time period of the first timer is used for prolonging the timing length of the first timer to a reference timing length of the Inactivity Timer of a DRX mechanism corresponding to a reference service when the terminal has monitored the Downlink Control Channel of the reference service.

The timing length of the Inactivity Timer of the target DRX mechanism is a maximum value of timing lengths of Inactivity Timers of the DRX mechanisms corresponding to the multiple services, and the timing length of the first timer of the target DRX mechanism is a minimum value of timing lengths of the Inactivity Timers of the DRX mechanisms corresponding to the multiple services. Or, the timing length of the Inactivity Timer of the target DRX mechanism is a maximum value of timing lengths of the Inactivity Timers of the DRX mechanisms corresponding to the multiple services, and the timing length of the first timer of the target DRX mechanism is a timing length of an Inactivity Timer of the DRX mechanism corresponding to a service with a highest priority among the multiple services.

In a possible example, the target DRX parameter is a timing length of an Inactivity Timer of the target DRX mechanism. The timing length of the Inactivity Timer of the target DRX mechanism is a timing length of an Inactivity Timer of a DRX mechanism corresponding to a reference service scheduled first by the network-side device during a time period of On-Duration of a current DRX mechanism.

The terminal shown in FIG. 7A or FIG. 7B may also be understood as an apparatus used as a terminal, which is not limited in implementations of the present disclosure.

Figure 1:
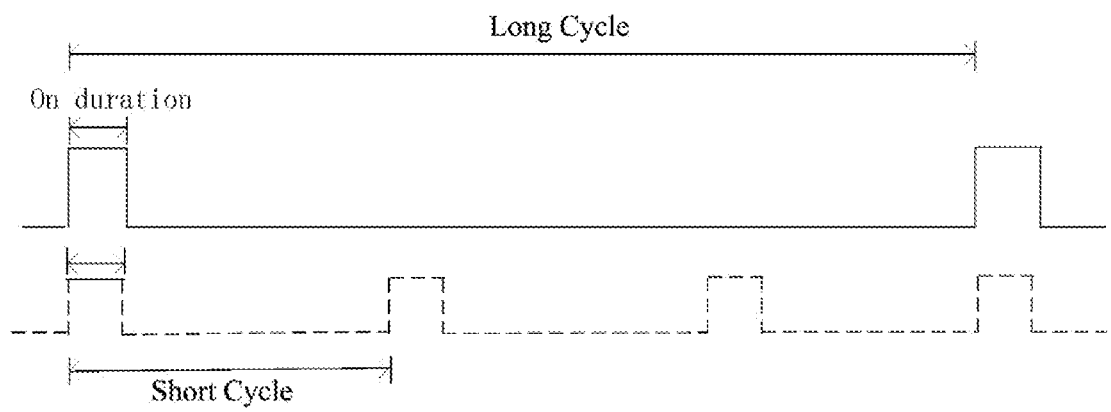
FIG. 1 is an example diagram of a long cycle and a short cycle in a conventional DRX mechanism.
Figure 2:
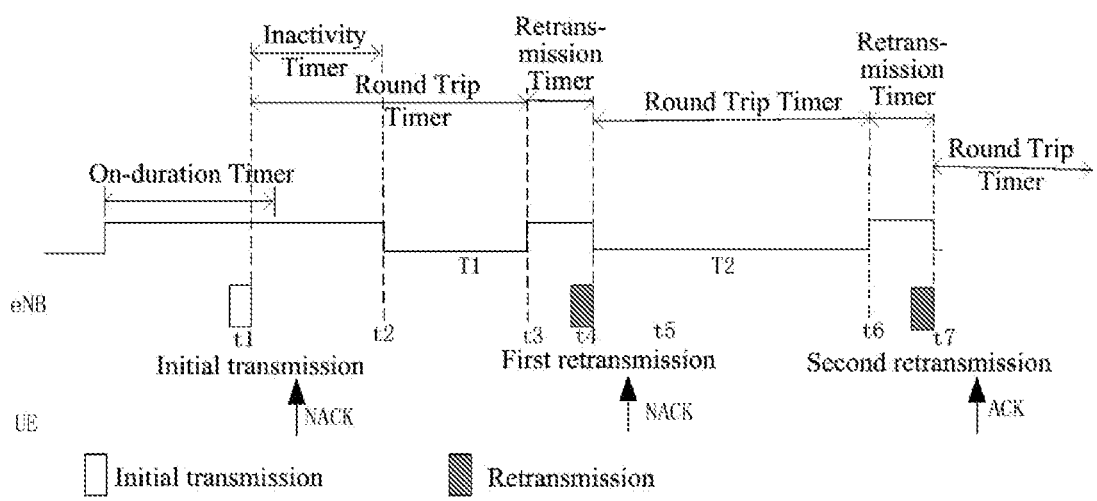
FIG. 2 is a functional diagram of timers of a conventional DRX mechanism.
Figure 8A:
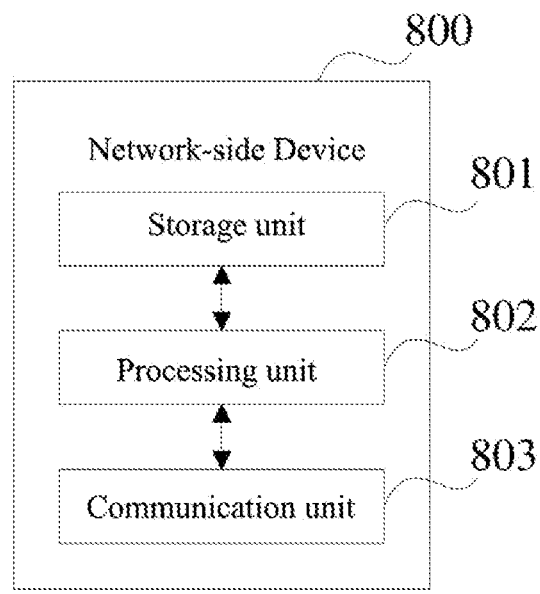
FIG. 8A is a schematic structural diagram of a network-side device provided by an implementation of the present disclosure.

In a case of using integrated units, FIG. 8A shows a possible structural diagram of a first core network device involved in the above implementations. A network-side device 800 includes a processing unit 802 and a communication unit 803. The processing unit 802 is used for controlling and managing acts of the network-side device. For example, the processing unit 802 is used for support the network-side device to perform acts 501 and 502 in FIG. 5 and/or other processes of the techniques described in the present document. The communication unit 803 is used for supporting communication between the network-side device and other devices, such as communication between the network-side device and the terminal as shown in FIG. 1. The network-side device may further include a storage unit 801 for storing program codes and data of the network-side device.

The processing unit 802 may be a processor or a controller, such as a Central Processing Unit (CPU), a general-purpose processor, a Digital Signal Processor (DSP), an application-specific integrated circuit (ASIC), a Field Programmable Gate Array (FPGA) or other programmable logic devices, a transistor logic device, a hardware component, or any combination thereof, which may implement or execute various illustrative logical blocks, modules, and circuits described in connection with content disclosed in the present disclosure. The processor may also be a combination for implementing computing functions, such as a combination including one or more microprocessors, a combination of DSP and microprocessors, and the like. The communication unit 803 may be a transceiver, a transceiving circuit. The storage unit 801 may be a memory.

The processing unit 802 is used for determining a target DRX parameter of a target DRX mechanism according to DRX parameters of DRX mechanisms corresponding to multiple services when data of multiple services of a terminal to be transmitted has been detected. The processing unit 802 is further used for sending the target DRX parameter to the terminal through the communication unit 803.

In a possible example, the processing unit 802 is specifically used for: determining a maximum value of the DRX parameters of the DRX mechanisms corresponding to the multiple services as the target DRX parameter of the target DRX mechanism; or, determining a DRX parameter of a DRX mechanism corresponding to a service with a highest priority among the multiple services as the target DRX parameter of the target DRX mechanism.

In a possible example, the target DRX parameter includes at least one of the following: a time length of a DRX Cycle, a timing length of an On-duration Timer, and a timing length of an Inactivity Timer.

In a possible example, the target DRX parameter include a timing length of an Inactivity Timer and a timing length of a first timer of a target DRX mechanism. The Inactivity Timer is used to be started when the terminal has monitored a Downlink Control Channel during a time period of On-Duration. A time period of the Inactivity Timer is used for the terminal to periodically monitor a Downlink Control Channel with a preset sleep time length being a monitoring period and the timing length of the first timer as a monitoring time length. The first timer is used to be started when the terminal has monitored a Downlink Control Channel during the time period of On-Duration, and a time period of the first timer is used for prolonging the timing length of the first timer to a reference timing length of the Inactivity Timer of a DRX mechanism corresponding to a reference service when the terminal has monitored the Downlink Control Channel of the reference service. The processing unit 802 is specifically used for: determining a maximum value of timing lengths of Inactivity Timers of DRX mechanisms corresponding to the multiple services as the timing length of the Inactivity Timer of the target DRX mechanism, and determining a minimum value of timing lengths of the Inactivity Timers of the DRX mechanisms corresponding to the multiple services as the timing length of the first timer of the target DRX mechanism; or, determining a maximum value of timing lengths of the Inactivity Timers of DRX mechanisms corresponding to the multiple services as the timing length of the Inactivity Timer of the target DRX mechanism, and determining a timing length of an Inactivity Timer of a DRX mechanism corresponding to a service with a highest priority among the multiple services as the timing length of the first timer of the target DRX mechanism.

In a possible example, the target DRX parameter is a timing length of an Inactivity Timer of the target DRX mechanism, and the processing unit 802 is specifically used for: determining a timing length of an Inactivity Timer of a DRX mechanism corresponding to a reference service scheduled first during a time period of On-Duration of a current DRX mechanism as the timing length of the Inactivity Timer of a target DRX mechanism.

Figure 8B:
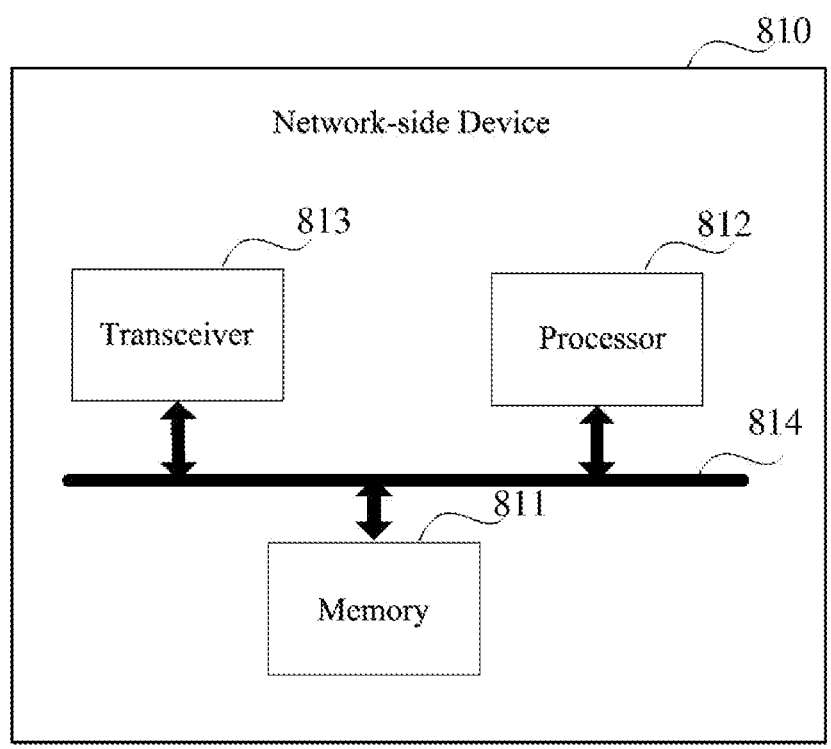
FIG. 8B is a schematic structural diagram of another network-side device provided by an implementation of the present disclosure.

When the processing unit 802 is a processor, the communication unit 803 is a transceiver, and the storage unit 801 is a memory, a network-side device involved in an implementation of the present disclosure may be a network-side device shown in FIG. 8B.

Referring to FIG. 8B, the network-side device 810 includes a processor 812, a transceiver 813, and a memory 811. Optionally, the network-side device 810 may further include a bus 814. The transceiver 813, the processor 812, and the memory 811 may be connected with each other via a bus 814. The bus 814 may be a Peripheral Component Interconnect (PCI) bus or an Extended Industry Standard Architecture (EISA) bus or the like. The bus 814 may be categorized as an address bus, a data bus, a control bus. For convenience of representation, only one thick line is used to represent the bus in FIG. 8B, but it does not represent only one bus or one type of bus.

The network-side device shown in FIG. 8A or FIG. 8B may also be understood as an apparatus used as a network-side device, which is not limited in implementations of the present disclosure.

Figure 9:
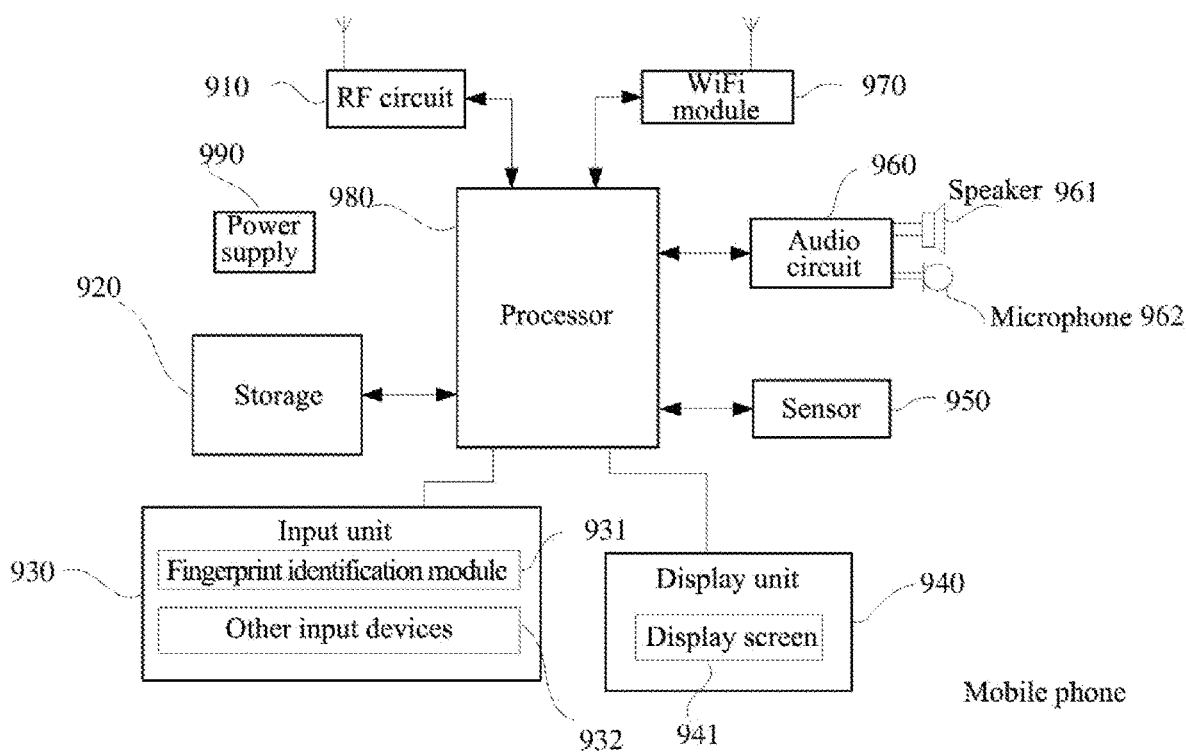
FIG. 9 is a schematic structural diagram of another terminal provided by an implementation of the present disclosure.

Another terminal is further provided in an implementation of the present disclosure, as illustrated in FIG. 9. For convenience of illustration, only parts related to implementations of the present disclosure are shown, and specific technical details which are not illustrated may refer to parts of the method according to the implementations of the present disclosure. The terminal may be any terminal device, such as a mobile phone, a tablet computer, a Personal Digital Assistant (PDA), a Point of Sales (POS), a vehicle-mounted computer. For example, the terminal may be a mobile phone.

FIG. 9 is a block diagram of a partial structure of a mobile phone related to a terminal provided by an implementation of the present disclosure. Referring to FIG. 9, the mobile phone includes parts such as a radio frequency (RF) circuit 910, a storage 920, an input unit 930, a display unit 940, a sensor 950, an audio circuit 960, a wireless fidelity (WiFi) module 970, a processor 980, and a power supply 990. A person skilled in the art may understand that the structure of the mobile phone shown in FIG. 9 does not constitute a limitation to the mobile phone, and the mobile phone may include more parts or fewer parts than those shown in the figure, or some parts may be combined, or a different part arrangement may be used.

In the following, each composition part of the mobile phone is specifically described in combination with FIG. 9.

The RF circuit 910 may be used for receiving and sending information. Generally, the RF circuit 910 includes, but is not limited to, an antenna, at least one amplifier, a transceiver, a coupler, a Low Noise Amplifier (LNA), a duplexer, and the like. In addition, the RF circuit 910 may further communicate with a network and other device via wireless communication. The wireless communication may use any communication standard or protocol, which includes, but is not limited to, a Global System for Mobile Communication (GSM), General Packet Radio Service (GPRS), Code Division Multiple Access (CDMA), Wideband Code Division Multiple Access (WCDMA), Long Term Evolution (LTE), e-mail, Short Messaging Service (SMS), and the like.

The storage 920 may be used for storing software programs and modules, and the processor 980 performs various functional applications and data processing of the mobile phone by running the software programs and modules stored in the storage 920. The storage 920 may mainly include a program storage area and a data storage area, wherein the program storage area may store an operating system, a computer program required by at least one function, and the like. The data storage area may store data or the like created according to the use of the mobile phone. In addition, the storage 920 may include high speed random access memory and may also include non-transitory memory, such as at least one disk memory device, flash memory device, or other volatile solid state memory device.

The input unit 930 may be used for receiving input number or character information, and generating a key signal input related to the user setting and function control of the mobile phone. Specifically, the input unit 930 may include a fingerprint identification module 931 and other input devices 932. The fingerprint identification module 931 may collect fingerprint data of a user thereon. Beside the fingerprint identification module 931, the input unit 930 may further include other input devices 932. Specifically, the other input devices 932 may include, but are not limited to, one or more of a touch control screen, a physical keyboard, a function key (for example, a volume control key, or a switch key), a track ball, a mouse, a joystick, and so on.

The display unit 940 may be used for displaying information input by the user or information provided for the user, and various menus of the mobile phone. The display unit 940 may include a display screen 941. Optionally, the display screen 941 may be configured with a Liquid Crystal Display (LCD), an Organic Light-Emitting Diode (OLED), or the like. Although the fingerprint identification module 931 and the display screen 941 are used as two separate parts to realize the input and output function of the mobile phone in FIG. 9, in some implementations, the fingerprint identification component 931 and the display screen 941 may be integrated to realize the input function and playing function of the mobile phone.

The mobile phone may further include at least one sensor 950, such as an optical sensor, a motion sensor or other sensors. Specifically, the optical sensor may include an ambient light sensor and a proximity sensor, wherein the ambient light sensor may adjust the luminance of the display screen 941 according to brightness of the ambient light, and the proximity sensor may be used to turn off the display screen 941 and/or backlight when the mobile phone is moved to an ear. As a motion sensor, an accelerometer sensor may be used to detect magnitudes of accelerations in various directions (generally in three axises), may detect the magnitude and direction of the gravity when the sensor is still, and may be used in an application for identifying a gesture of a mobile phone (for example, switching between landscape and portrait, related games, and gesture calibration of a magnetometer) and a function related to vibration identification (such as a pedometer and a tap). Other sensors, for example, a gyroscope, a barometer, a hygrometer, a thermometer, and an infrared sensor, which may be configured in the mobile phone, will not be further described herein.

An audio circuit 960, a speaker 961, and a microphone 962 may provide an audio interface between a user and the mobile phone. The audio circuit 960 can transmit the electrical signals converted from the received audio data to the speaker 961, and the speaker 961 can convert the electrical signals into sound signals for playing. On the other hand, the microphone 962 converts the collected sound signals into electrical signals, which are received by the audio circuit 960 and then converted into audio data. Then the audio data is played to processor 980 for processing, and then the audio data is sent, for example, to another mobile phone via the RF circuit 910, or the audio data is played to the storage 920 for further processing.

WiFi is a short-range wireless transmission technology. The mobile phone may help users to send and receive e-mails, browse web pages and access streaming media and the like through a WiFi module 970. The WiFi module 970 provides users with wireless broadband Internet access. Although FIG. 9 shows the WiFi module 970, it may be understood that the WiFi module 970 is not an essential part of the mobile phone, and may be completely omitted as required without changing the essence of the present disclosure.

The processor 980 is a control center of the mobile phone, and connects various parts of the whole mobile phone by using various interfaces and circuits. By running or executing software programs and/or modules stored in the storage 920 and invoking data stored in the storage 920, the processor 980 performs various functions of the mobile phone and processes data, thereby performing overall monitoring on the mobile phone. Optionally, the processor 980 may include one or more processors. Preferably, the processor 980 may integrate an application processor and a modem processor, wherein the application processor mainly handles an operating system, a user interface, an application program, and the like, and the modem processor mainly handles wireless communication. It may be understood that, the foregoing modem processor may be not integrated into the processor 980.

The mobile phone further includes the power supply 990 (such as a battery) for supplying power to each part. Preferably, the power supply may be logically connected to the processor 980 by a power management system, thereby implementing functions such as charging, discharging, and power consumption management by using the power management system.

Although not shown in the figure, the mobile phone may further include a camera, a Bluetooth module, and the like, which will not further be described herein.

In the aforementioned implementations shown in FIG. 4 to FIG. 6B, the flows at the terminal side in various acts of the methods can be implemented based on the structure of the mobile phone.

In the foregoing implementations shown in FIG. 7A and FIG. 7B, the function of each unit can be implemented based on the structure of the mobile phone.

An implementation of the present disclosure further provides a computer storage medium, wherein the computer storage medium can store a program, and the program, when being executed, includes part or all of the acts of any one of the methods for DRX parameter configuration described in the method implementations.

The acts of the method or algorithm described in the implementations of the present disclosure may be implemented in hardware or in a manner of executing software instructions by a processor. The software instructions may be composed by corresponding software modules. The software modules may be stored in a Random Access Memory (RAM), a flash memory, a Read Only Memory (ROM), an Erasable Programmable Read Only Memory (EPROM), an Electrically Erasable Programmable Read Only Memory (EEPROM), a register, a hard disk, a removable hard disk, a Compact Disc Read-Only Memory (CD-ROM), or a storage medium in any other form well-known in the art. An exemplary storage medium is coupled to a processor such that the processor can read information from the storage medium, and write information to the storage medium. Of course, the storage medium may be a component of the processor. The processor and the storage medium may be located in an ASIC. Besides, the ASIC may be located in a gateway device or a mobility management network element. Of course, the processor and the storage medium may also exist as a separate component in the gateway device or the mobility management network element.

Those skilled in the art will recognize that, in one or more examples described above, the functions described in the implementations of the present disclosure may be implemented in hardware, software, firmware, or any combination thereof. When implemented in software, these functions may be stored in a computer readable medium or transmitted as one or more instructions or codes on the computer readable medium. The computer readable medium includes a computer storage medium and a communication medium, wherein the communication medium includes any medium that facilitates transfer of computer programs from one place to another. The storage medium may be any available medium accessible by a general-purpose or special-purpose computer.

The specific implementation modes described above have further explained the purpose, technical solution and beneficial effects of the implementations of the present disclosure in details. It should be understood that the above are only the specific implementation modes of the implementations of the present disclosure, which are not used to limit the protection scope of the implementations of the present disclosure. Any modification, equivalent substitution, improvement, etc. made on the basis of the technical solution of the implementations of the present disclosure shall be included in the protection scope of the implementations of the present disclosure.

What we claim is:

1. A method for discontinuous reception (DRX) parameter configuration, comprising:
    determining, by a terminal, a target DRX parameter of a target DRX mechanism according to DRX parameters of DRX mechanisms corresponding to a plurality of services when the terminal has detected data of the plurality of services, wherein service types of the plurality of services are different, and the plurality of services are from different logical channels or logical channel groups;
    wherein the target DRX parameter comprises a timing length of an Inactivity Timer and a timing length of a first timer of the target DRX mechanism, and the Inactivity Timer is used to be started when the terminal has monitored a Downlink Control Channel during a time period of On-Duration; a time period of the Inactivity Timer is used for the terminal to periodically monitor a Downlink Control Channel with a preset sleep time length being a monitoring period and the timing length of the first timer being a monitoring time length; the first timer is used to be started when the terminal has monitored a Downlink Control Channel during the time period of On-Duration, and a time period of the first timer is used for prolonging the timing length of the first timer to a reference timing length of the Inactivity Timer of a DRX mechanism corresponding to a reference service when the terminal has monitored the Downlink Control Channel of the reference service; and
    wherein determining, by the terminal, the target DRX parameter of the target DRX mechanism of the terminal according to the DRX parameters of the DRX mechanisms corresponding to the plurality of services, comprises:
        determining, by the terminal, a maximum value of timing lengths of the Inactivity Timers of the DRX mechanisms corresponding to the plurality of services as the timing length of the Inactivity Timer of the target DRX mechanism; and
        determining, by the terminal, a timing length of an Inactivity Timer of a DRX mechanism corresponding to a service with a highest priority among the plurality of services as the timing length of the first timer of the target DRX mechanism.

2. The method of claim 1, wherein the target DRX parameter comprises at least one of the following: a time length of a DRX Cycle, a timing length of an On-duration Timer, and a timing length of an Inactivity Timer.

3. The method of claim 1, wherein the target DRX parameter is a timing length of an Inactivity Timer of the target DRX mechanism, and determining, by the terminal, the target DRX parameter of the target DRX mechanism of the terminal according to the DRX parameters of the DRX mechanisms corresponding to the plurality of services, comprises:
    determining, by the terminal, a timing length of an Inactivity Timer of a DRX mechanism corresponding to a reference service scheduled first during a time period of On-Duration of a current DRX mechanism as the timing length of the Inactivity Timer of the target DRX mechanism.

4. The method of claim 1, wherein determining, by the terminal, the target DRX parameter of the target DRX mechanism of the terminal, comprises:
    receiving, by the terminal, a target DRX parameter of a target DRX mechanism sent by a network-side device, and determining, by the terminal, the target DRX parameter of the target DRX mechanism of the terminal, wherein the target DRX parameter is determined by the network-side device according to DRX parameters of DRX mechanisms corresponding to the plurality of services.

5. The method of claim 4, wherein the target DRX parameter is a DRX parameter of a DRX mechanism corresponding to a service with a highest priority among the plurality of services.

6. The method of claim 5, wherein the target DRX parameter comprises at least one of the following:
    a time length of a DRX Cycle, a timing length of an On-duration Timer, and a timing length of an Inactivity Timer.

7. The method of claim 1, wherein the target DRX parameter is a timing length of an Inactivity Timer of the target DRX mechanism; and
    the timing length of the Inactivity Timer of the target DRX mechanism is a timing length of an Inactivity Timer of a DRX mechanism corresponding to a reference service scheduled first by a network-side device during a time period of On-Duration of a current DRX mechanism.

8. A terminal, comprising a processor and a transceiver, wherein the processor is communicatively connected with the transceiver,
    wherein the processor is configured to determine a target DRX parameter of a target DRX mechanism according to DRX parameters of DRX mechanisms corresponding to a plurality of services when data of the plurality of services has been detected, wherein service types of the plurality of services are different, and the plurality of services are from different logical channels or logical channel groups;
    wherein the target DRX parameter comprises a timing length of an Inactivity Timer and a timing length of a first timer of the target DRX mechanism, and the Inactivity Timer is used to be started when the terminal has monitored a Downlink Control Channel during a time period of On-Duration; a time period of the Inactivity Timer is used for the terminal to periodically monitor a Downlink Control Channel with a preset sleep time length being a monitoring period and the timing length of the first timer being a monitoring time length; the first timer is used to be started when the terminal has monitored a Downlink Control Channel during the time period of On-Duration, and a time period of the first timer is used for prolonging the timing length of the first timer to a reference timing length of the Inactivity Timer of a DRX mechanism corresponding to a reference service when the terminal has monitored the Downlink Control Channel of the reference service; and wherein the processor is further configured to determine a maximum value of timing lengths of the Inactivity Timers of the DRX mechanisms corresponding to the plurality of services as the timing length of the Inactivity Timer of the target DRX mechanism; and determine a timing length of an Inactivity Timer of a DRX mechanism corresponding to a service with a highest priority among the plurality of services as the timing length of the first timer of the target DRX mechanism.

9. The terminal of claim 8, wherein the target DRX parameter comprises at least one of the following: a time length of a DRX Cycle, a timing length of an On-duration Timer, and a timing length of an Inactivity Timer.

10. The terminal of claim 8, wherein the target DRX parameter is a timing length of an Inactivity Timer of the target DRX mechanism; and the processor is further configured to:

determine a timing length of an Inactivity Timer of a DRX mechanism corresponding to a reference service scheduled first during a time period of On-Duration of a current DRX mechanism as the timing length of the Inactivity Timer of the target DRX mechanism.

11. The terminal of claim 8, wherein the processor is further configured to:

receive a target DRX parameter of a target DRX mechanism sent by a network-side device through the transceiver, and determine the target DRX parameter of the target DRX mechanism, wherein the target DRX parameter is determined by the network-side device according to DRX parameters of DRX mechanisms corresponding to the plurality of services.

12. The terminal of claim 11, wherein the target DRX parameter is a DRX parameter of a DRX mechanism corresponding to a service with a highest priority among the plurality of services.

13. The terminal of claim 12, wherein the target DRX parameter comprises at least one of the following:

a time length of a DRX Cycle, a timing length of an On-duration Timer, and a timing length of an Inactivity Timer.

14. The terminal of claim 8, wherein the target DRX parameter is a timing length of an Inactivity Timer of the target DRX mechanism; and the timing length of the Inactivity Timer of the target DRX mechanism is a timing length of an Inactivity Timer of a DRX mechanism corresponding to a reference service scheduled first by a network-side device during a time period of On-Duration of a current DRX mechanism.

* * * * *